United States Patent
Gloden et al.

(10) Patent No.: US 6,690,208 B2
(45) Date of Patent: Feb. 10, 2004

(54) ROBOT CRASH PROTECTOR

(75) Inventors: Michael L. Gloden, Apex, NC (US); Douglas K. Lawson, Chapel Hill, NC (US)

(73) Assignee: ATI Industrial Automation, Inc., Garner, NC (US)

( * ) Notice: Subject to any disclaimer, the term of this patent is extended or adjusted under 35 U.S.C. 154(b) by 159 days.

(21) Appl. No.: 10/082,448

(22) Filed: Feb. 23, 2002

(65) Prior Publication Data

US 2003/0160520 A1 Aug. 28, 2003

(51) Int. Cl.[7] .............................. H02H 1/00; B25J 19/06
(52) U.S. Cl. ........................ 326/326; 901/46; 192/150; 200/82 A
(58) Field of Search .................... 307/326; 192/150, 192/126.1; 200/82 A, 82 C, 82 R, 532, 535; 901/46

(56) References Cited

U.S. PATENT DOCUMENTS

| | | | | |
|---|---|---|---|---|
| 4,714,865 A | * | 12/1987 | Chin et al. ................. | 318/563 |
| 5,086,901 A | * | 2/1992 | Petronis et al. ............. | 192/150 |
| 6,069,415 A | | 5/2000 | Little et al. | |
| 6,214,057 B1 | | 4/2001 | Spencer et al. | |
| 6,346,751 B1 | * | 2/2002 | Delfino et al. .............. | 307/326 |

* cited by examiner

*Primary Examiner*—Gregory J. Toatley, Jr.
(74) *Attorney, Agent, or Firm*—Coats & Bennett, P.L.L.C.

(57) ABSTRACT

A robotic crash protection device is adapted to be interposed between a robot arm and a robotic tool for detecting a crash. The device includes a housing, a piston having a generally central bore movably mounted within the housing, an actuator for engaging the piston and moving the piston in response to a crash, and a switch disposed within the housing and generally aligned with the bore of the piston. The switch contacts are disposed such that in a default position the bore of the piston engages the contacts and maintains the contacts in one switch state, and in the event of a crash the piston moves and permits the contacts to assume the opposite switch state. A non-circular contact surface between the actuator and the piston ensures a consistent response to lateral forces applied in to the axial direction in any radial direction.

50 Claims, 3 Drawing Sheets

ROBOT CRASH PROTECTOR

BACKGROUND OF THE INVENTION

The present invention relates generally to the field of robotics and specifically to robotic tool coupling device to prevent damage in the event of a crash event.

Robots are widely utilized in industrial assembly line applications to perform repetitive tasks very precisely without the need for human operation, interaction, or supervision. For example, robots are commonly used in the automotive industry to perform a number of tasks such as material handling and spot-welding of automobile bodies.

To amortize the considerable cost of an industrial robot over a variety of tasks, the robot arm is typically separate from a diverse array of tools, which are removably attached to the end of the robot arm. Occasionally, a robotic tool may encounter unexpected obstacles in the production line environment. If the robotic tool impacts the obstacle with sufficient force, or if the robot continues to move once the tool has come into contact with the obstacle, the robotic tool or the robot arm itself may become damaged. Additionally, a robotic tool may exert or encounter a torque force with respect to the robot arm that exceeds safe limits, also causing damage.

In order to avoid this undesirable result, a crash protection device may be connected between the robot arm and the robotic tool. The crash protection device senses the degree of force between the robot arm and the robotic tool, and signals a controller (that may be associated with the robot arm, the robotic tool, both, or some other system component) of the impact or excess torque condition, collectively referred to herein as a "crash condition." The controller may then shut down the robotic tool, halt further movement of the robotic arm, trigger an alarm, or take other relevant action.

Considering the wide variety of tasks the robot may be programmed to perform, and the great diversity of robotic tools available for attachment to it, it is difficult or impossible to accurately predict a single threshold force or torque that should trigger a crash event. In some applications, some degree of force or torque between the robot arm and the robotic tool may be desirable or even unavoidable; in other applications, the same degree of force should trigger a crash signal to the controller. To accommodate a variety of applications, a crash protection device may be designed to "give" or flex, thus providing the tool with a limited amount of freedom of movement when it encounters an obstacle or exerts a torque. This flexibility is referred to as "compliance." Preferably, the degree of compliance in a robot crash protection device is variable, and more preferably, it can be adjusted without disassembly of the device.

Because an obstacle can exert different forces on the robotic tool depending upon where the two come into contact, it is desirable for a crash protection device to provide compliance in several directions (e.g., in the x, y, and z directions, as well as rotationally). Additionally, because the environments in which robots are used are sometimes hostile and unsafe for humans, it is also desirable for the crash protection device to be capable of automatically returning to its original position, or "resetting," when the overload condition no longer exists, without the need for human intervention. Thus, it is desirable to provide a crash protection device capable of resetting itself, regardless of whether the overload condition was due to linear or rotational movement.

Compliance in a plurality of directions normally means that two or more sensors are required to detect an overload condition, since displacement of the crash protection device can occur in a variety of directions. Each additional sensor, however, adds additional expense to the crash protection device. Thus, it is desirable to provide a crash protection device that exhibits compliance in a plurality of directions, but requires only one sensor to detect an overload condition.

SUMMARY OF THE INVENTION

The present invention relates to a robotic crash protection device adapted to be interposed between a robot arm and a robotic tool for detecting a crash. The device includes a housing, a piston having a generally central bore movably mounted within the housing, an actuator for engaging the piston and moving the piston in response to a crash, and a switch disposed within the housing and generally aligned with the bore of the piston. The switch has a pair of contacts operative to move between open and closed positions. The contacts are disposed such that in one position the bore of the piston engages the contacts and maintains the contacts in a closed position and in another position the bore of the piston permits the contacts to assume an open position.

In another aspect, the present invention relates to an electrical sensor for a robotic crash protection device. The sensor includes a switch disposed within the robotic crash protection device, the switch including two contacts, each of which includes an engagement surface. The sensor also includes a dielectric annular collar, and an adjustment screw threadedly connected to the switch and operative to alter the axial position of the switch with respect to the collar. The switch is actuated to a first state when the engagement surfaces are confined within the collar in a default condition of the robotic crash protection device, and the switch is actuated to a second state by the engagement surfaces moving outside of the collar in response to a robotic tool crash that transitions the robotic crash protection device out of the default condition.

DETAILED DESCRIPTION OF THE INVENTION

Figure 1:
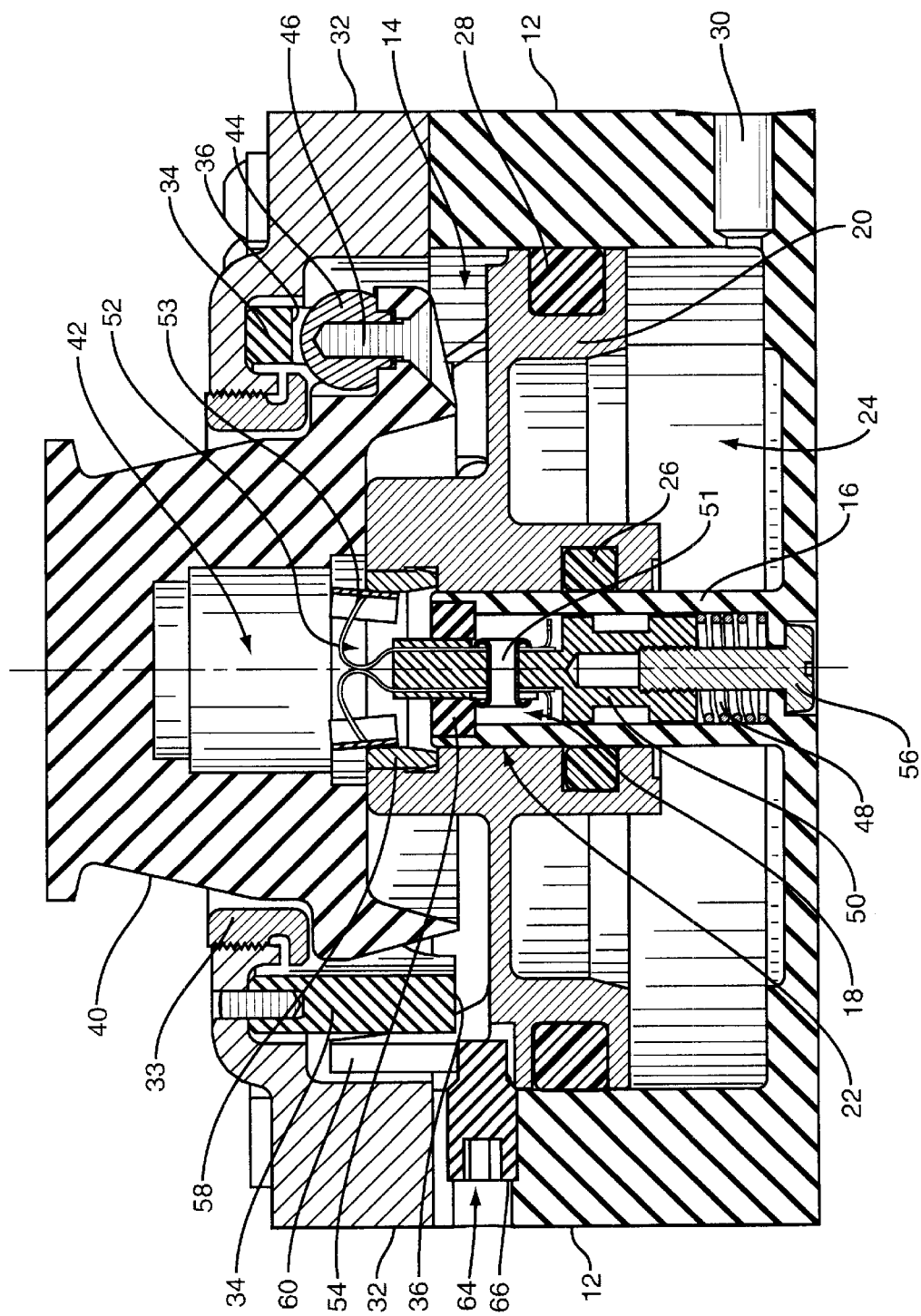
FIG. 1 is a transverse sectional view of the robotic crash protection device of the present invention.

The crash protection device of the present invention is described with reference to FIGS. 1 and 2, and is indicated generally by the numeral 10. The crash protection device 10 is designed to be interposed between a robot arm (not shown) and a robotic tool (not shown). While the crash protection device 10 is explicated herein as being interposed in a particular orientation, one of skill in the art will readily recognize that the crash protection device 10 may as readily be installed in the other orientation.

The crash protection device 10 includes a housing 12 that may be attached to a robot arm. The housing 12 includes a cavity or chamber 14 formed therein, and a central axial stem or sleeve 16. The stem 16 contains a bore 18 formed therethrough.

Disposed within the cavity 14 in the housing 12 is a piston 20. The piston 20 includes a central axial bore 22 sized to accept the stem 16 of the housing 12. In one embodiment, the bore 22 of piston 20 includes a dielectric collar 58 fitted therein. The piston 20 also includes a multi-lobed contact surface 21 affixed thereto. When disposed within the chamber 14 of housing 12, the piston 20 defines an annular fluid chamber 24 within the housing 12. Annular sealing rings 26 and 28 form a fluid-tight seal between the piston 20 and the stem 16, and between the piston 20 and the inner wall of the housing 12, respectively. A fluid inlet 30 allows a fluid, such as for example air, to be injected into or released from the fluid chamber 24. As will be readily appreciated by inspection of FIGS. 1 and 2, the injection of pressurized fluid into the fluid chamber 24 biases the piston 20 upwardly as viewed in FIG. 1.

Secured to the housing 12 is a cap 32. The cap 32 includes an annular adjustment ring 33 attached thereto. In one embodiment, the annular adjustment ring 33 is threadedly attached to the cap 32. Also attached to the cap 32, and interposed between the cap 32 and the piston 20, is a cam member 34. The cam member 34 includes an annular cam surface 36 oriented towards the piston 20. As depicted in FIG. 2, the cam surface 36 includes a plurality of generally V-shaped grooves 38 formed therein and spaced apart around the circumference thereof.

An actuator 40, having a void or chamber 42 formed therein, is disposed within, but not secured to, the assembly comprising the cap 32 and housing 12. The actuator 40 may be attached to a robotic tool, and the interaction of the actuator 40 with the piston 20 forms the basis of operation of the crash protection device 10, as described more fully below.

An annular adjustment ring 33 is provided in the cap 32. The annular adjustment ring 33 is threadedly connected to the cap 32, and its position in the axial direction may be altered by turning the annular adjustment ring 33 relative to the cap 32. By turning the annular adjustment ring 33, the space or gap between the annular adjustment ring 33 and the actuator 40 in the default (i.e., non-crash) condition may be adjusted.

Radially disposed about the periphery of the base of the actuator 40, and corresponding to the V-shaped grooves 38 formed in the cam surface 36 of cam member 34, are a plurality of ball members 44. Ball members 44 are secured to the actuator 40 by screws 46.

In operation, the actuator 40 may be connected to a robotic tool. FIG. 1 depicts the default configuration of the crash protection device 10, wherein the actuator 40 extends outwardly from the housing comprising the cap 32 and housing 12. The actuator 40 is urged to this position by the piston 20, when the fluid chamber 24 is pressurized by the injection of fluid through fluid inlet port 30. The upward movement of the actuator 40 (that is, movement in an axial direction away from the base of the housing 12) is arrested by the balls 44 being seated in the apexes of the V-shaped grooves 38 formed in the cam surface 36. Note that typically a ball 44 will seat within a corresponding V-shaped groove 38 such that the ball 44 contacts the cam surface 36 at two points, one on either side of the apex of the ball 44 (hence the apparent gap between the ball 44 and the cam surface 36 in FIG. 1).

In the event of a crash of the robotic tool that induces a force on the actuator 40 with a component in a direction not axially aligned with the crash protection device 10, the actuator 40 will be canted, or displaced from its axial alignment, relative to the assembly comprising the cap 32 and the housing 12. As can be readily seen in FIG. 1, such canting or non-axial displacement of the actuator 40 will move the piston 20 in a downward direction, towards the base of the housing 12. As described more fully below, the canting of the actuator 40 will cause the actuator 40 to engage the piston 20 at a point on the multi-lobed contact surface 21 opposite the applied force.

Similarly, if the crash event induces a force on the actuator 40 in an axial direction towards the crash protection device 10, the actuator 40 will displace the piston 20 axially towards the base of the housing 12. In either case, once the force on the actuator 40 is removed, the piston 20 (under the influence of pressurized fluid in the fluid chamber 24) will urge the actuator 40 to its fully extended, axially aligned position as depicted in FIG. 1, with the balls 44 seated in the V-shaped grooves in the cam surface 36. In this manner, the crash protection device 10 resets itself following a crash event.

Figure 2:
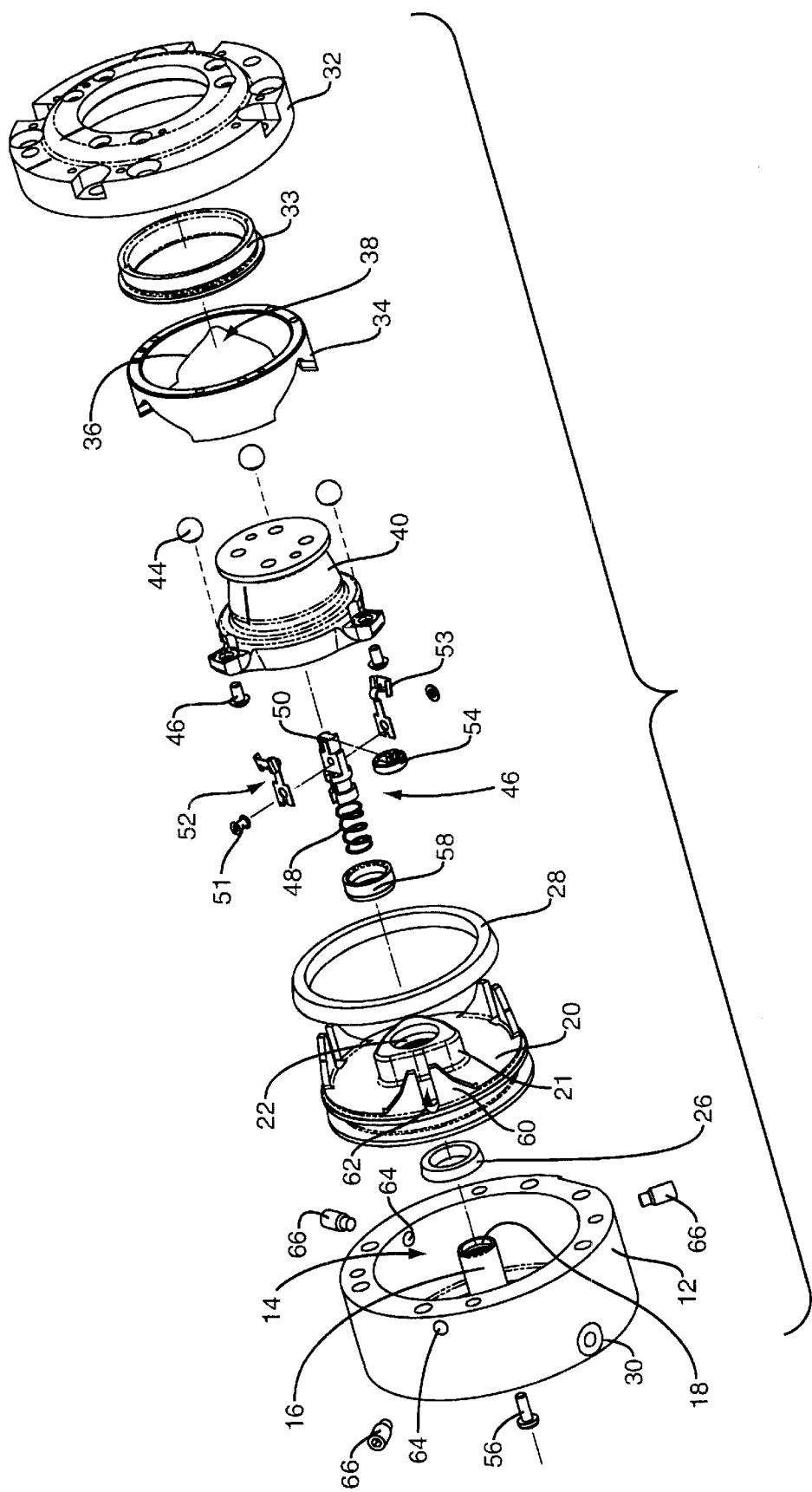
FIG. 2 is an exploded perspective diagram of the robotic crash protection device of FIG. 1.

As can be seen with reference to FIG. 2, a torque or rotational force induced on the actuator 40 will additionally cause the actuator 40 to displace the piston 20 axially towards the base of the housing 12. This displacement results from the interaction of the ball members 44 secured to the actuator 40, and the V-shaped grooves 38 formed in the cam surface 36 of cam member 34. In the default state depicted in FIG. 1, i.e., with no forces induced by the robotic tool on the actuator 40, the actuator 40 resides within the cam member 34 (which is secured to the cap 32) with the ball members 44 seated at the peaks or apexes of the V-shaped grooves 38. Any rotation of the actuator 40 then causes the ball members 44 to be displaced from the respective centers of the V-shaped grooves 38, displacing the actuator 40 axially towards the housing 12 as the ball members 44 move along the cam surface 36. Note that when the rotational force on the actuator 40 is removed, the piston 20, under the influence of pressurized fluid in the fluid chamber 24, will urge the actuator 40 in an axial direction away from the housing 12. The ball members 44 will ride along the cam surface 36, coming to rest within the V-shaped grooves 38. In this manner, the crash protection device 10 resets itself following a rotational crash event.

Thus, either a transverse (i.e., non-axial), axial, or rotational force induced on the actuator 40 by the robotic tool will cause the actuator 40 to displace the piston 20 axially towards the base of the housing 12. Such axial displacement is resisted by the fluid pressure in fluid chamber 24. By adjusting the pressure in the fluid chamber 24, the degree of force required to displace the piston 20 may be adjusted. The movement of the piston 20 in the axial direction towards the base of the housing 12 to a sufficient degree will cause the crash protection device 10 to generate a logical signal indicative of a crash event, as described more fully below.

An important aspect of compliance of the crash protection device 10 is the degree of force required to trigger a crash indication. A common problem in crash protection devices 10 that utilize rotational crash detection and resetting methods similar to the balls 44 and cam 34 of the present invention is that, for any given pressure in fluid chamber 24, a different magnitude of non-axial force on the actuator 40 may be required to trigger a crash event, depending on the radial direction of the force. Or, from a different perspective, the same magnitude of a non-axial force applied to the actuator 40 by a robotic tool crash may trigger a crash indication if applied in one direction, but may not trigger a crash indication if applied in a different direction.

Figure 3:
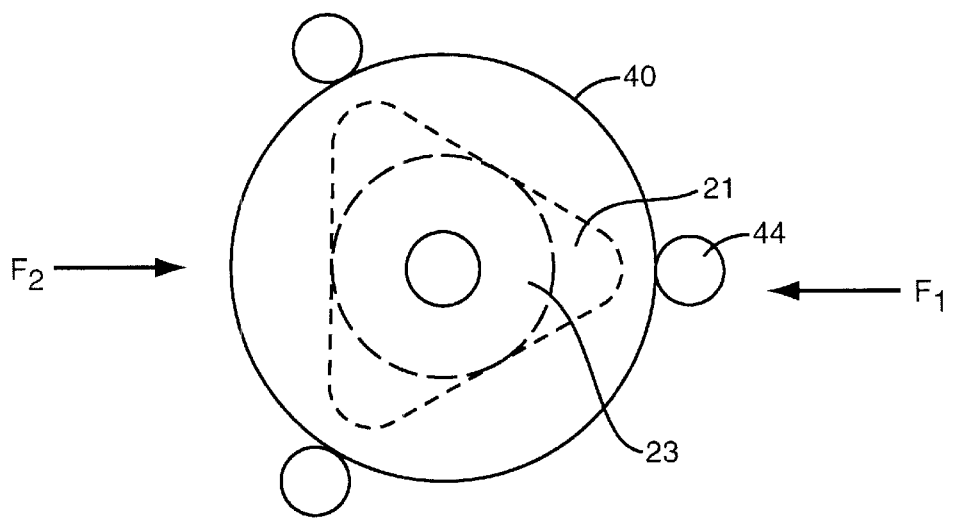
FIG. 3 is a schematic diagram of a top and side view of the robotic crash protection device of FIG. 1.
Figure 3:
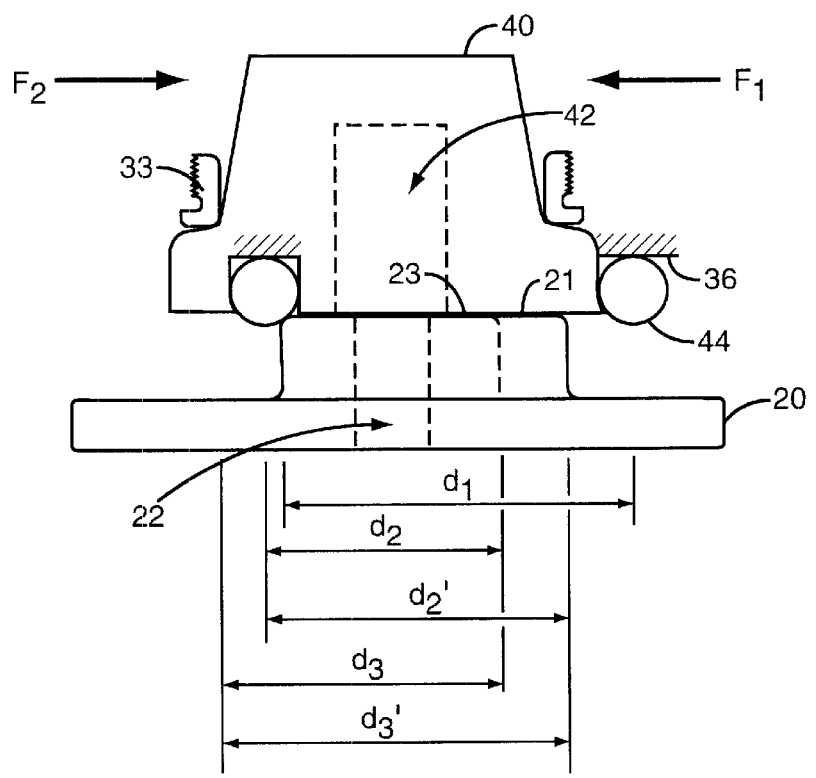

This phenomenon is illustrated with reference to FIG. 3, depicting a schematic diagram of the top and side view of the actuator 40, with balls 44 attached thereto, and the piston 20, with the multi-lobed contact surface 21 of the present invention. The annular adjustment ring 33 is shown in the side view. All of the features depicted in FIG. 3 are in schematic form, are for explanatory purpose only, and are not intended to be representational. Also depicted in dotted-line form, for explanatory purpose only, is a hypothetical circular contact surface 23, as may be known in the prior art. The balls 44 are equally spaced around the periphery of the actuator 40, and in a default state, seated against cam surface 36 as the actuator 40 is biased in an upward direction by fluid pressure behind the piston 20.

First, consider a force $F_1$ applied horizontally to the actuator 40 at a position coincident with a ball 44, as shown. The force $F_1$ will induce a counter-clockwise torque on the actuator 40, causing the actuator 40 to cant to the left from vertical, or pivot about the point(s) of contact between right-most ball 44 and its mating cam surface 36. The actuator 40 will thus press in a vertical downward direction on the left-most edge of the contact surface 21. This force is opposed by the fluid pressure behind the piston 20, which acts through that contact point. To displace the piston 20, the force $F_1$ must generate a torque on the actuator 40, the effective moment arm of which is the distance from the pivot point (at the center of the ball 44) to the point of application of opposing piston force at the left of contact surface 21, shown in FIG. 3 as $d_1$. If $F_1$ is sufficient to pivot the actuator 40 to the left and push the piston 20 downward, the right side of the actuator 40 will move downward, away from the annular adjustment ring 33, as the pivot point is on the ball 44. Thus, the effective moment arm remains the distance $d_1$.

Next, consider a force $F_2$ applied to the actuator 40 at a position between two balls 44, as shown. In a similar manner, a clockwise torque will be induced on the actuator 40, causing it to cant to the right from vertical. In this case, the pivot point will initially comprise the tops of both of the left-most balls 44. If the piston 20 included a hypothetical circular contact surface 23, the rightmost edge of which is indicated a dotted line, the moment arm of the torque opposing $F_2$ (generated by the fluid pressure behind piston 20 and acting through the point of contact) would be the distance from the center of the left-most balls 44 to the right-most edge of the contact surface 23, shown in FIG. 3 as $d_2$. It is readily apparent that $d_1$ is significantly greater than $d_2$. Thus, a lesser force $F_2$ is required to overcome the opposing torque generated by the piston 20 than is the case for the force $F_1$. This means that a different degree of force is required to trigger a crash indication, depending on which radial direction around the actuator 40 the force is applied, relative to the position of the balls 44.

According to one aspect of the present invention, this discrepancy in the effect of initial applied forces dependent on their radial direction of application is minimized by providing a multi-lobed contact surface 21 between the piston 20 and the actuator 40. Consider again the force $F_2$. With the multi-lobed contact surface 21, the point of application of the downward force of the actuator 40 on the piston 20 is right-most edge of the multi-lobed contact surface 21. This produces an effective moment arm for the torque opposing $F_2$ of $d_2'$, as shown in FIG. 3. $d_2'$ is closer to $d_1$ than is $d_2$, thus the magnitude of the forces $F_1$ and $F_2$ required to achieve the same initial displacement of the piston 20 is less dissimilar.

However, for any lateral force applied to the actuator 40 in a radial direction that is not coincident with a ball 44, a second factor comes into play following the initial canting of the actuator 40 and concomitant displacement of the piston 20. Again, consider force $F_2$. Following the initial canting of the actuator 40 to the right as described above, the left edge of the actuator 40 (which extends to the left of the pivot point on the two balls 44), will move upward. According to the present invention, this edge of the actuator 40 will then contact the annular adjustment ring 33 that is secured to the cap 32. This new point of contact will then become the pivot point about which the actuator 40 will pivot for any further canting due to $F_2$. This effectively increases the moment arm of the opposing torque generated by the fluid pressure behind the piston 20. The analysis is directly analogous to the discussion above. For a hypothetical circular contact surface 23, the moment arm would be the distance $d_3$. The multi-lobed contact surface 21 of the present invention, however, extends the effective moment arm to the distance $d_3'$, which is substantially equal to the moment arm $d_1$. Furthermore, the annular adjustment ring 33 may be adjusted to provide only a slight gap between the annular adjustment ring 33 and the actuator 40, ensuring that the initial opposing torque generated in response to the force $F_2$—with a moment arm of $d_2'$—is present for only a brief duration (the time necessary for the actuator 40 to cant to a sufficient degree to move through the gap and contact the annular adjustment ring 33).

A similar analysis of both initial and sustained forces applied at other radial positions of the actuator 40 will yield desired effective moment arms between $d_1$ and $d_3'$. The distance of the outer edge of the multi-lobed contact surface 21 from the central axis of the piston 20 thus varies continuously with respect to radial position around the circumference of the actuator 40, extending to a maximum at a radial position coincident with the placement of a ball 44, and at a minimum opposite the position of a ball 44.

For this force balancing effect to occur, the lobes of the multi-lobed contact surface 21 between the piston 20 and the actuator 40 must be maintained in radial position with respect to the balls 44 on the actuator 40. According to one embodiment of the present invention, the multi-lobed contact surface 21 is affixed to the piston 20, and the radial alignment is accomplished with vertical fins 60 disposed around the periphery of the piston 20 (see FIG. 2). Each vertical fin 60 includes a vertical slot 62 formed therein. A cylindrical-tipped set screw 66, inserted through threaded holes 64 in the housing 12, engages the vertical slot 62. The set screws 66 in the vertical slots 62 restrict rotational motion of the piston 20 within the housing, allowing only axial motion thereof. By proper placement of the threaded holes 64 relative to the cam member 34 (which determines the default radial orientation of the actuator 40 by guiding the balls 44 to the center of the V-shaped grooves 38), the lobes of the multi-lobed contact surface 21 on the piston 20 are maintained in the proper radial position with respect to the balls 44 on the actuator 40. Note that the multi-lobed contact surface 21 may, in other embodiments within the scope of the present invention, be affixed to the actuator 40, either between the actuator 40 and the piston 20, or between the actuator 40 and the annular adjustment ring 33.

The purpose of the multi-lobed contact surface 21 is thus to configure the crash protection device 10 so as to result in a first set of generally equal moment arms for an initial torque on the actuator 40 generated in opposition to any lateral or non-axial force applied to the actuator 40, regardless of the direction of the applied force. Additionally, the multi-lobed contact surface 21 configures the crash protection device 10 so as to result in a second set of generally equal moment arms for a sustained torque on the actuator 40 generated in opposition to a lateral force applied in any radial direction. This is a somewhat imprecise exercise—while the multi-lobed contact surface 21 as described herein may not produce precisely equal moment arms for every possible direction of force application in either case, it does significantly reduce the wide discrepancy in moment arms resulting from the relative placement and spacing of the balls 44 around the periphery of the actuator 40. The response of the crash protection device 10 to forces applied in different directions is thus predictable, and the compliance of the device 10 is not substantially dependent on the rotational position of the device 10, with respect to the applied force.

In addition to the amount of force required to trigger a crash indication, another important aspect of compliance of a crash protection device 10 is the amount of movement that is allowed before a crash is indicated. According to the present invention, this parameter may be easily adjusted, without disassembly of the crash protection device 10.

Disposed within the bore 18 of the stem 16 is a switch assembly, indicated generally in FIG. 2 at 46. Switch assembly 46 comprises a switch bias spring 48, a non-conductive switch contact carrier 50, rivet 51, switch contacts 52, and an anti-rotation collet 54. The switch assembly 46 is adjustably retained within the bore 18 by the switch adjustment screw 56, and is electrically isolated from the stem 16 by the dielectric collar 58. The switch contacts 52 are secured to the non-conductive switch contact carrier 50 by a non-conductive or insulated rivet 51. Switch contacts 52 each include an engagement surface 53 that contacts, and slides in and out of, the dielectric collar 58. As shown in FIG. 1, when the engagement surfaces 53 of electrical contacts 52 are disposed within the dielectric collar 58, the switch contacts 52 contact each other at or near the center of the bore 18, and are held in a closed position (i.e., an electrically conductive condition). As the piston 20 moves in an axial direction towards the base of the housing 12, the engagement surfaces 53 of the switch contacts 52 move out of the dielectric collar 58 and at least partially into the chamber 42 formed within the actuator 40. The switch contacts 52 are biased to an open position, and upon moving outside of the confines of dielectric collar 58, the switch contacts 52 are free to assume an open position (i.e., an electrical open circuit condition). This, of course, switches the state of the switch assembly 46, which switch state is transferred to a robot arm controller as indicative of a crash event. One of skill in the art will readily recognize that the switch contacts 52 may be designed so as to effect an open circuit condition in the default state (i.e., within the dielectric collar 58), and to assume a closed circuit condition upon moving out of the default state during a crash event.

The switch assembly 46 is held in an axial position relative to the housing 12 by the switch adjustment screw 56. The switch assembly 46 is biased in an axial direction away from the switch adjustment screw 56 by the switch spring 48. The relative position of the switch assembly 46, and hence the relative position of the sliding contact surfaces 53 of the switch contacts 52 relative to the dielectric collar 58, is adjustable via the switch adjustment screw 56. The anti-rotational collet 54 prevents rotational motion of the switch assembly 46 within the bore 18 when the switch adjustment screw 56 is turned (i.e., it forces turning of the switch assembly screw 56 to translate into only axial positioning of the switch assembly 46 within the bore 18).

As is readily apparent from FIG. 1 and the foregoing description, the compliance of the crash protection device 10, i.e., the degree of motion of the actuator 40 relative to the assembly comprising the cap 32 and housing 12 prior to the crash protection device 10 sensing a crash event and transmitting that state to a robot controller, is adjustable by adjusting the axial position of the switch assembly 46 within the bore 18 (by turning switch adjustment screw 56).

Thus, according to the present invention, the degree of motion that will trigger a crash indication is easily adjusted. With the relative effect of forces applied at any point radially around the actuator 40 substantially the same, as describe above, the magnitude of force required to induce such motion may be adjusted by altering the fluid pressure in fluid chamber 24. Hence, both aspects of the compliance of the crash protection device 10—the magnitude of force and the amount of movement—are adjustable, to adapt the crash protection device 10 to a wide variety of robotic tool applications.

As used herein, the term "vertical" denotes a force or motion in the axial direction, and "horizontal" denotes a force or motion perpendicular to the axial direction. Similarly, "upwardly" or "downwardly" refer only to the relative orientation of components as depicted in the relevant drawing(s). These terms are for clarity of expression only; no specific orientation of the robotic crash protection device 10 or any component thereof with respect to the horizon is implied or required.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A robotic crash protection device adapted to be interposed between a robot arm and a robotic tool for detecting a crash, comprising:
   a housing;
   a piston having a generally central bore movably mounted within the housing;
   an actuator for engaging said piston and moving the piston in response to a crash;
   a switch disposed within the housing and generally aligned with the bore of said piston and having a pair of contacts operative to move between first and second positions, and wherein the contacts are disposed such that in a default position the bore of the piston engages the contacts and maintains the contacts in the first position, and in a position resulting from a crash the bore of the piston permits the contacts to assume the second position.

2. The robotic crash protection device of claim 1 further comprising an adjustment mechanism for adjusting the sensitivity of the crash protection device by adjusting the position of said switch with respect to said bore of said piston.

3. The robotic crash protection device of claim 2 wherein said adjustment mechanism includes a screw threaded into a portion of said switch such that said switch is moved axially within the bore of the piston in response to the turning of said screw.

4. The robotic crash protection device of claim 3 further comprising a spring interposed between said screw and said switch.

5. The robotic crash protection device of claim 1 wherein the contacts of said switch are biased to said second position where the contact are open, and wherein in a default mode the bore of said piston engages the contacts and maintains the contacts in said first position where the contacts are closed, and wherein when said piston moves such that the contacts clear the bore, the contacts assume said second position.

6. The robotic crash protection device of claim 1 including a sleeve that extends through the bore of said piston, and wherein at least a portion of said switch is housed within said sleeve.

7. The robotic crash protection device of claim 6 further including an adjustment mechanism for adjusting the sensitivity of the crash protection device by adjusting the position of said switch with respect to the bore of said piston; and wherein said adjustment mechanism includes a screw threaded into a portion of said switch such that said switch is moved axially within the bore of said piston and axially within said sleeve in response to the turning of said screw.

8. The robotic crash protection device of claim 7 wherein said switch includes a carrier having the contacts secured thereto and a collar extending around at least a portion of said switch and seated within said sleeve so as to prevent said switch from rotating within said sleeve in response to said screw being turned.

9. The robotic crash protection device of claim 7 wherein said screw projects axially through a portion of said sleeve, and wherein there is provided a spring housed within said sleeve, said screw operative to bias said screw in one direction.

10. A robotic crash protection device, comprising:
   a housing for attachment to a robot arm or a robotic tool, said housing containing a first cavity;
   a piston disposed in said housing and containing a bore therethrough, said piston forming a fluid chamber in said first cavity whereby fluid in said chamber urges said piston to a first position;
   a stem for attachment to the other of the robot arm or the robotic tool, said stem operative to move said piston from said first position in response to a crash by the robotic tool; and
   a switch adjustably disposed in said housing, said switch comprising contacts extending into the bore of said piston and actuated by said bore to place said switch in a first state when said piston is in said first position, and said contacts placing said switch in a second state in response to said piston moving from said first position.

11. The device of claim 10, wherein the sensitivity of said device is adjustable by altering the axial position of said switch within said housing and the bore of said piston when said piston is in the extended position.

12. The device of claim 11, wherein placing said switch closer to said stem increases the sensitivity of said device.

13. An electrical sensor for a robotic crash protection device, comprising:
   a switch disposed within said robotic crash protection device, said switch including two contacts, each said contact including an engagement surface;
   a dielectric annular collar, and
   an adjustment screw threadedly connected to said switch and operative to alter the axial position of said switch with respect to said collar;
   such that said switch is actuated to a first state when said engagement surfaces are confined within said collar in a default condition of said robotic crash protection device, and said switch is actuated to a second state by said engagement surfaces moving outside of said collar in response to a robotic tool crash that transitions said robotic crash protection device out of said default condition.

14. The sensor of claim 13, wherein said switch includes at least one flat section, and further including a collet with a flat void mated to said flat section and operative to restrict rotating motion of said switch within said collar when said screw is turned.

15. The sensor of claim 14, wherein the length of relative motion in an axial direction between said collar and said engagement surfaces required to actuate said switch from said first state to said second state is adjustable by said screw.

16. A method of detecting a crash of a robotic tool moved by a robot arm, comprising:
   interposing a crash protection device between the robotic tool and the robot arm, said device including a base;
   securing a switch including a pair of engagement surfaces in an adjustable spaced manner to said base, said switch biased to a second state;
   maintaining said switch in a first state by engaging said engagement surfaces with the inner surface of a cylinder, said cylinder moveable relative to said base and at least partially enclosing said engagement surfaces in a default condition;
   moving said cylinder in response to a crash of the robotic tool so as to slide said cylinder away from said engagement surfaces, allowing said switch to transition to said second state; and
   sensing said second state of said switch as indicative of a crash of the robotic tool.

17. The method of claim 16, further comprising adjusting the position of said switch relative to said base to alter the degree of motion of said cylinder required to allow said switch to transition to said second state.

18. The method of claim 17 wherein adjusting the position of said switch comprises turning a screw connecting said switch with said base.

19. A method of actuating a switch contained within a robotic crash protection device and signaling a crash, comprising:
   biasing contacts associated with said switch to an open position;
   closing said switch by engaging said contacts with a moveable circular surface contained within said robotic crash protection device and urging said contacts inwardly to where said contacts touch;
   enabling said contacts to assume the open position by moving said circular surface relative to said contacts such that said contacts may spring to the open position; and
   emitting a crash signal in response to said circular surface moving sufficient to enable the state of said switch to change from an open to a closed position or vice versa.

20. A method of actuating a switch contained in a robotic crash protection device and signaling a crash, comprising:
   biasing contacts of said switch to an open or closed position, wherein in said closed position said switch assumes a first state and in said open position said switch assumes a second state;
   positioning said switch in the crash protection device such that during at least one state of said switch, a bore area, associated with a moveable piston disposed within said crash protection device, extends around and engages said contacts of said switch; and in response to a crash, moving said piston and bore area such that said switch is actuated from one state to the other state, resulting in a crash signal being emitted.

21. The method of claim 20 wherein the bore area of said piston includes a collar.

22. The method of claim 20 wherein in one state the bore area of said piston engages the contacts of said switch, and in the other state the bore area is spaced from the contacts.

23. The method of claim 20 wherein the contacts of said switch are biased to assume an open position and wherein in a default position the bore area of said piston engages the contacts and maintains the contacts in a closed position.

24. The method of claim 20 including adjusting the sensitivity of said crash protection device by axially adjusting said switch with respect to the bore area of said piston.

25. The method of claim 24 including engaging said switch with a screw and turning said screw so as to move said switch axially with respect to the bore area of said piston.

26. A robotic crash protection device adapted to be interposed between a robot arm and a robotic tool for detecting a crash, comprising:
   a housing having a central axis and an annular engagement surface;
   a piston movably mounted within said housing;
   a sensor operative to detect axial movement of said piston within said housing and to indicate a crash in response thereto;
   an actuator including a plurality of contact points and an annular rim, said actuator maintained adjacent said piston and generally aligned with said central axis in a default state, and operative to transition to a non-axially aligned position in response to a lateral force applied thereto, said actuator in said non-axially aligned position pivoting on either one or more of said contact points or the point of contact between said annular rim and said engagement surface; and
   a multi-lobed contact surface between said piston and said actuator such that upon application of a lateral force to said actuator in any radial direction, the distance between the point of contact between said actuator and said piston on said contact surface, and the pivot point of said actuator, is substantially equal.

27. The device of claim 26, wherein said multi-lobed contact surface is affixed to said piston.

28. The device of claim 26, wherein said lobes of said multi-lobed contact surface are maintained in general radial alignment with the respective said contact points on said actuator via at least one rotation restricting member affixed in spaced relationship with said multi-lobed contact surface, said rotation restricting member having an elongate axial opening therein, and a corresponding insertion member affixed to said housing and inserted at least partially into said elongate axial opening, said insertion member moving freely within said elongate axial opening as said rotation restricting member moves in an axial direction within said housing, and said insertion member operative to restrict rotational motion of said rotation restricting member.

29. The device of claim 26, wherein said actuator includes three said contact points affixed thereto, and wherein said multi-lobed contact surface includes three said lobes.

30. A robotic crash protection device adapted to be interposed between a robot arm and a robotic tool for detecting a crash, comprising:
   a housing having a base;
   a piston movably mounted within said housing;
   a sensor operative to detect axial movement of said piston within said housing towards said base and to indicate a crash in response thereto;
   an actuator maintained adjacent said piston opposite said base and biased in a direction away from said base by said piston, said actuator operative to move said piston in a direction toward said base in response to a crash; and
   a cap rigidly affixed to said housing and arresting movement of said actuator in a direction away from said base, said cap including an annular adjustment ring adjustably attached thereto for adjusting the clearance between said actuator and said cap in a non-crash condition.

31. The device of claim 30, wherein said annular adjustment ring is threadedly attached to said cap.

32. A robotic crash protection device to be interposed between a robot arm and a robotic tool for detecting a crash, comprising:
   a housing;
   a piston moveably mounted within the housing;
   a sensor operative to detect movement of the piston and to indicate a crash in response to a certain movement of the piston; and
   an adjustment ring adjustably connected to the housing for adjusting the clearance between the actuator and the housing.

33. The robotic crash protection device of claim 32 wherein the actuator extends through the adjustment ring.

34. The robotic crash protection device of claim 32 wherein the adjustment ring includes a bearing surface for engaging a portion of the actuator.

35. The robotic crash protection device of claim 32 wherein the adjustment ring extends around the actuator and a portion of the actuator projects from the housing and through the adjustment ring.

36. The robotic crash protection device of claim 35 wherein the housing includes a side having a threaded opening formed therein, and wherein the adjustment ring includes a threaded portion that enables the adjustment ring to be threadedly secured within the threaded opening formed in the side of the housing.

37. A robotic crash protection device adapted to be interposed between a robot arm and a robotic tool for detecting a crash, comprising:
   a housing;
   a piston moveably mounted within the housing;
   an actuator moveably mounted in the housing and operative to move axially and to tilt within the housing;
   a contact surface interposed between the piston and actuator such that the movement of the contact surface in response to the movement of the actuator can result in the movement of the piston;
   the contact surface being configured such that generally equal lateral forces applied around the actuator, result in a generally equal force being transmitted to the piston; and
   a sensor operative to detect movement of the piston and to indicate a crash in response to the movement of the piston.

38. The robotic crash protection device of claim 37 wherein various moment arms are created as a result of said actuator tilting in response to various lateral loads, and wherein said moment arms are generally equal for lateral forces applied around said actuator.

39. The robotic crash protection device of claim 37 wherein said actuator moves about one or more points in response to lateral loads being applied to said actuator, and wherein a moment arm is defined between one point or a line connecting two points and an engagement point where said actuator engages said contact surface; and wherein said moment arms created for a series of lateral loads applied around said actuator are generally equal.

40. The robotic crash protection device of claim 37 wherein said actuator tilts about one or more points and wherein said contact surface includes a noncircular surface having a central area and a series of outer areas that project from said central area towards said points.

41. The robotic crash protection device of claim 37 wherein the angular position of said contact surface is fixed relative to said actuator.

42. The robotic crash protection device of claim 37 wherein in response to a lateral force being applied to the actuator, the actuator moves about at least one point.

43. The robotic crash protection device of claim 42 wherein in response to a lateral force being applied to the actuator, the actuator moves about the least one point and thereafter engages at least a second point and moves about the second point.

44. The robotic crash protection device of claim 37 wherein the actuator includes a series of curved-shaped bearing points and wherein at least a portion of the actuator is disposed adjacent an engagement surface; and wherein in response to a lateral load being applied to the actuator, the actuator moves about at least one of the curved-shaped bearing points and thereafter a portion of the actuator engages the engagement surface and moves about one or more points on the engagement surface.

45. The robotic crash protection device of claim 44 wherein a moment arm is created between the at least one curved-shaped bearing point and a point where the actuator engages the contact surface; and wherein there is a second moment arm created between the at least one point where the actuator engages the engagement surface and the point where the actuator engages the contact surface.

46. The robotic crash protection device of claim 37 wherein the actuator includes first and second surfaces; wherein disposed adjacent the actuator is first engagement surface and a second engagement surface; and wherein in response to a lateral force being applied to the actuator, the actuator moves about at least one point due to the engagement of the first surface of the actuator with the first engagement surface and moves about at least one second point due to the engagement of the second surface of the actuator engaging the second engagement surface.

47. The robotic crash protection device of claim 46 wherein the first surface of the actuator includes a series of curved-shaped contact points.

48. The robotic crash protection device of claim 47 wherein the second surface of the actuator includes an annular surface formed on the actuator and wherein the second engagement surface extends around the actuator and lies adjacent the annular surface of the actuator.

49. The robotic crash protection device of claim 48 wherein the first engagement surface includes a cam surface disposed adjacent the curved-shaped contacts points of the actuator and the second engagement surface includes an annular engagement surface, and wherein in response to a lateral force being applied against the actuator, one or more of the curved-shaped contact points engages the cam surface and the actuator moves about the one or more contact points and thereafter the annular surface of the actuator engages the adjacent annular engagement surface such that the actuator moves about a contact point created by the engagement of the annular surface of the actuator with the annular engagement surface.

50. The robotic crash protection device of claim 37 wherein the actuator includes a series of curved-shaped bearing points disposed adjacent a cam surface that extends around the actuator and wherein the actuator is provided with an annular surface that is disposed adjacent an overlying engagement surface; and wherein in response to a lateral force applied to the actuator, the actuator may move about one or more of the curved-shaped bearing points due to the engagement of the one or more curved-shaped bearing points with the cam surface and may also move about at least one other point due to the engagement of the annular surface of the actuator with the adjacent engagement surface.

* * * * *